Jan. 2, 1951 W. Y. PAN 2,536,886
GAIN CONTROL CIRCUIT
Filed Sept. 29, 1948
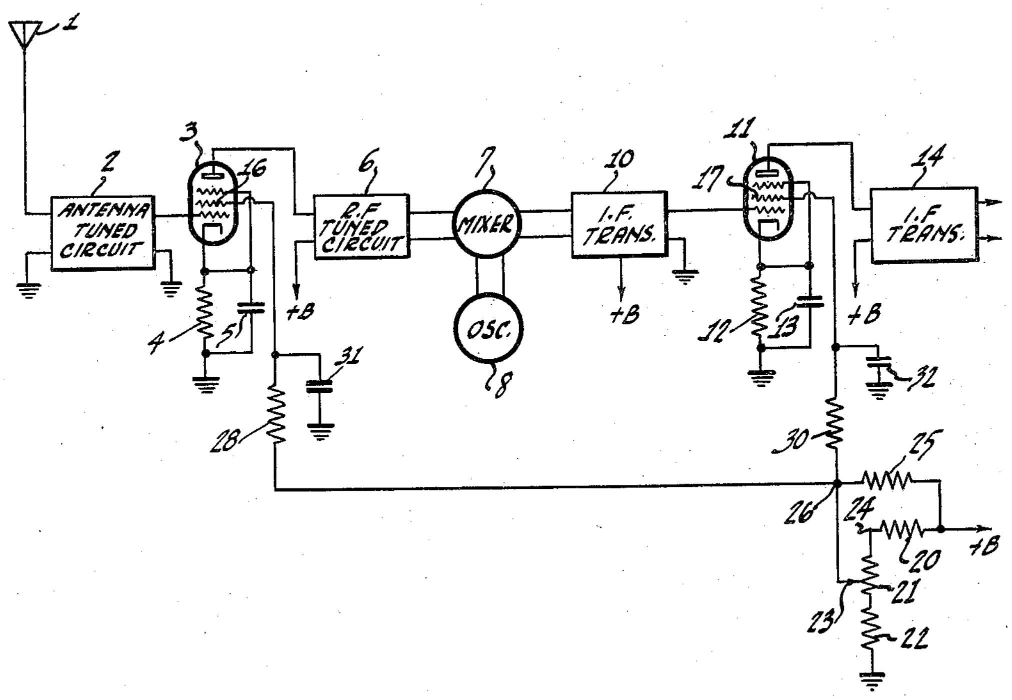
INVENTOR
WEN YUAN PAN
BY Philip L. Cooper
ATTORNEY Patented Jan. 2, 1951 2,536,886

UNITED STATES PATENT OFFICE 2,536,886

GAIN CONTROL CIRCUIT

Wen-Yuan Pan, Collingswood, N. J., assignor to Radio Corporation of America, a corporation of Delaware Application September 29, 1948, Serial No. 51,748

4 Claims. (Cl. 178—44)

This invention relates generally to control circuits for radio receivers and particularly to a manual sensitivity control circuit.

It is conventional practice to provide commercial communications receivers and high-fidelity broadcast receivers with a manual R. F. gain or sensitivity control circuit. This permits a manual control of the gain of one or more of the radio-frequency or intermediate-frequency amplifier stages of the receiver. The purpose of this gain control is to prevent distortion of the reproduced signal when the voltage swing of the received carrier wave at the control grid of the tube extends beyond the linear portion of the tube characteristic relating the control grid voltage to the plate current. Conventionally, the sensitivity of the receiver is controlled by varying the voltage supplied to the screen grid of a screen grid radio-frequency or intermediate-frequency, amplifier tube such as a tetrode or pentode. The term radio-frequency amplifier is meant to include also an intermediate-frequency amplifier. It is preferred to control the screen grid voltage for obtaining sensitivity control because the control grid voltage is usually varied by an automatic volume control.

A conventional gain control circuit for varying the screen grid voltage includes a suitable direct current source across which a potentiometer is connected which has a movable contact or tap for varying the screen grid voltage of a radio-frequency amplifier. This arrangement, however, is uneconomical because when the movable contact of the potentiometer is near its maximum voltage position, a relatively large current including the screen grid current passes through a small portion of the potentiometer. In order to prevent the potentiometer from becoming over-loaded it is necessary to provide a large potentiometer with a large current-carrying capacity. Such a potentiometer is expensive and requires more space than is desirable. Furthermore, the IR loss in the potentiometer may still develop a large amount of heat which may sometimes cause the local oscillator to drift.

It is furthermore desirable that the sensitivity control circuit be electrically isolated from the output circuit of the controlled amplifier, an expedient which is commonly known as decoupling. Thus, the sensitivity control circuit should be decoupled for radio frequency currents from the amplifier output circuit. In addition, the sensitivity control circuit should also act as a hum filter to prevent hum modulation of the amplifier. The direct current source which supplies the screen grid voltage may in some cases be insufficiently regulated. Thus, it is also desirable that the total current required for the sensitivity control circuit be nearly constant in magnitude regardless of the sensitivity control setting. The screen grid current will, of course, vary considerably when the screen grid voltage is changed but the current drawn from the source should remain approximately constant.

It is the principal object of the present invention therefore, to provide a sensitivity control circuit in which the amount of the maximum current which may flow through a portion or through the entire potentiometer is reduced, thereby to permit a reduction in the size and cost of the potentiometer with a consequent saving of space.

A further object of the invention is to provide a sensitivity control circuit whose operation will cause a minimum variation of the current flowing through the control circuit thereby maintaining the current drain of the source approximately constant.

Another object of the invention is to provide a sensitivity gain control circuit that is effectively decoupled from the amplifier output circuit for radio frequency currents as well as for hum modulation.

In accordance with the present invention, a sensitivity control circuit includes a resistor connected between the positive terminal of a voltage source and the potentiometer and a further resistor is connected between the positive terminal of the source and the variable tap. Thus, the current through the potentiometer is reduced by that flowing through the further resistor. Consequently, it is feasible to utilize a smaller and cheaper potentiometer because the current therethrough is considerable reduced. Furthermore, the two extra resistors in combination with the decoupling resistor and the bypass capacitor of the control circuit form an audio frequency filter which will prevent hum modulation of the amplifier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a circuit diagram of a portion of a superheterodyne receiver including the gain control circuit of the invention.

The acompanying drawing, to which reference is now made, illustrates schematically a superheterodyne receiver including antenna 1 for intercepting a modulated carrier wave. The wave is impressed through antenna tuned circuit 2 on radio-frequency (RF) amplifier 3 which has its cathode grounded through resistor 4 bypassed for RF currents by capacitor 5. The thus-amplified wave is impressed through RF tuned circuit 6 on mixer 7 to which is coupled local oscillator 8. The mixer will convert the received wave to an intermediate-frequency (IF) wave impressed on IF transformer 10 which, in turn, is coupled to IF amplifier 11. The cathode of amplifier 11 is grounded through resistor 12 bypassed for IF currents by capacitor 13. The amplified IF wave may be obtained from IF transformer 14 and the demodulated signal may be derived in any conventional manner.

Amplifiers 3 and 11 may be pentodes, as illustrated, or tetrodes, that is, screen grid tubes. Thus, the gain of amplifiers 3 and 11 which may both be termed radio-frequency amplifiers, may be controlled by varying the voltage applied to their screen grids 16 and 17 respectively. To this end there is provided a manual gain or sensitivity control circuit. The sensitivity control circuit includes resistors 20, 21 and 22 connected serially between the positive terminal of a suitable source of voltage, indicated at +B, and ground. Resistor 21 is arranged as a potentiometer having a movable contact or tap 23. Resistor 25 is connected in accordance with the present invention between +B and tap 23. The junction point 26 of tap 23 and resistor 25 is connected to screen grids 16 and 17 through decoupling resistors 28 and 30 respectively. Preferably, decoupling resistors 28 and 30 are bypassed to ground through capacitors 31 and 32 respectively.

In operation, the current from the positive terminal of the current source, that is, from +B, to the screen grids, will divide between resistor 25 on the one hand and resistor 20 and the portion of potentiometer 21 between junction point 24 and tap 23 on the other hand. From junction point 26 the current will then flow through decoupling resistor 28, screen grid 16 and cathode resistor 4 to ground or through decoupling resistor 30, screen grid 17 and cathode resistor 12 to ground. A constant portion of the current will also flow from +B through resistors 20, 21 and 22 to ground.

Accordingly, regardless of the position of tap 23, only a portion of the current will flow through potentiometer 21. Thus, when tap 23 is near junction point 24, the voltage of tap 23 will be comparatively high. This high voltage is impressed on screen grids 16 and 17 and consequently a comparatively large screen grid current will flow. Due to the presence of resistor 25 only a portion of this current will flow through the potentiometer and hence a potentiometer may be used which has less current-carrying capacity and which is less expensive and requires less space. Preferably, the resistance values of resistors 20 and 25 are equal so that approximately one half of the screen grid current flows through resistor 25 and the remainder through resistor 20 and potentiometer 21.

Decoupling resistors 28 and 30 with their respective bypass capacitors 31 and 32 form a conventional radio-frequency decoupling filter. However, resistors 20 and 25 in conjunction with decoupling resistors 28 and 30 and their respective capacitors 31 and 32 form a further filter which has a much longer time constant and which will prevent hum modulation from voltage source +B. A further feature of the gain control circuit of the invention is that the total current drawn from voltage source +B is approximately constant regardless of the setting of tap 23. This will considerably reduce the regulation requirements which have to be met by the source +B.

The resistance values of resistors 20 and 25 which may be designated $R_{20}$ and $R_{25}$ can be determined by the following formula:

$$R_{20}=R_{25}=\frac{2(E-E_{sc})}{I_{sc}+\dfrac{E}{\left(\frac{1}{2}R_{20}+R_{21}+R_{22}\right)}}$$

where E is the voltage of source +B in volts, $E_{sc}$ is the normal operating screen grid voltage of amplifiers 3 or 11 or both in volts and where $I_{sc}$ is the total normal operating screen grid current of amplifiers 3 or 11 or both in amperes. $R_{21}$ designates the resistance of potentiometer 21. The resistance value of resistor 22 which may be designated $R_{22}$, may be determined from the following formula:

$$R_{22}=\frac{E_{min}R_{21}}{E-E_{min}}$$

In the above formula $E_{min}$ is the minimum screen grid voltage of amplifiers 3 or 11 for the desired gain control range in volts. The value of resistor 22 determines the minimum voltage which can be applied to the screen grids.

The maximum current flows through potentiometer 21 when tap 23 is near junction point 24. Under these conditions the maximum current $I_{max}$ is given by the following formula:

$$I_{max}=\left(I_{sc}+\frac{E_{sc}}{R_{21}+R_{22}}\right)$$

In the above formula $I_{max}$ is the maximum current flowing through a portion of potentiometer 21. It will be observed that the current $I_{max}$ is one half that of a conventional gain control circuit. A reduction of the current through potentiometer 21 by a factor of one half will reduce the wattage of the potentiometer to one quarter.

By way of example, resistors 20 and 25 may each have a resistance of 33,000 ohms while decoupling resistors 28 and 30 may each have a resistance value of 1,000 ohms. Potentiometer 21 may have a resistance value of 50,000 ohms while capacitors 31 and 32 may each have a capacitance of .05 microfarad.

There has thus been disclosed a manual sensitivity control circuit which will reduce the size and the cost of the potentiometer used for controlling the gain of the receiver. Furthermore, the circuit will function as a filter to minimize hum modulation. A further feature of the sensitivity control circuit of the invention is its substantially constant current drain regardless of the sensitivity control setting. Accordingly, a current source may be utilized which has but little regulation. The disclosed circuit may be used for controlling the sensitivity of one or more RF of IF amplifier stages.

What is claimed is:

1. A manual sensitivity control circuit for a radio-frequency amplifier having a screen grid, said circuit comprising a source of potential having two terminals, a first and a second impedance element connected in series arrangement across said terminals, said first impedance element being connected to one of said terminals, a variable tap on said second impedance element, a third impedance element connected between said one of said terminals and said tap to bypass said first impedance element, said tap being connected to said screen grid, whereby the current flowing through said first and said second impedance element is reduced for any position of said tap by that flowing through said third impedance element.

2. A manual sensitivity control circuit for a radio-frequency amplifier having a screen grid, said circuit comprising a source of positive potential having a positive and a negative terminal, a first, a second and a third impedance element connected in series across said terminals, a variable tap on said second impedance element, a fourth impedance element connected between said positive terminal and said tap and in shunt with said first impedance element, said tap being connected to said screen grid, the impedance of said first and fourth element being approximately equal, whereby the current flowing through said first and said second impedance element is reduced for any position of said tap by that flowing through said fourth impedance element.

3. A manual sensitivity control circuit for a radio-frequency amplifier having a screen grid, said circuit comprising a source of voltage having two terminals, a first and a second resistor connected in series between said terminals, a tap manually variable on said second resistor, a third resistor connected between said tap and the junction point between said first resistor and one of said terminals and bypassing said first resistor, a decoupling resistor connected between said screen grid and said tap, and a capacitor connected between said screen grid and the other of said terminals, said first, said third and said decoupling resistor in combination with said capacitor preventing hum modulation, and movement of said tap regulating the voltage supplied to said screen grid without materially changing the total current supplied by said source.

4. A manual sensitivity control circuit for a radio-frequency amplifier having a screen grid, said circuit comprising a source of voltage having a positive and a negative terminal, a first, a second and a third resistor connected in series between said terminals, a tap manually variable on said second resistor, a fourth resistor connected between said tap and said positive terminal and in shunt with said first resistor, a decoupling resistor connected between said screen grid and said tap, the resistance of said decoupling resistor being small compared to that of said first or said fourth resistor, and a capacitor connected between said screen grid and said negative terminal, said first, said fourth and said decoupling resistor in combination with said capacitor preventing hum modulation, and movement of said tap regulating the voltage supplied to said screen grid without materially changing the total current supplied by said source.

WEN YUAN PAN.

REFERENCES CITED

The following references are of record in the file of this patent:

UNITED STATES PATENTS

| Number | Name | Date |
|---|---|---|
| 2,173,222 | Belar | Sept. 19, 1939 |
| 2,358,325 | Fyler | Sept. 19, 1944 |